United States Patent
Green et al.

(10) Patent No.: US 7,360,623 B2
(45) Date of Patent: Apr. 22, 2008

(54) MOTOR MOUNT ASSEMBLY FOR CONTROLLING A MOBILE MACHINE

(75) Inventors: David Maxwell Green, Cupertino, CA (US); Arthur F. Lange, Sunnyvale, CA (US); James Veneziano, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 423 days.

(21) Appl. No.: 11/000,737

(22) Filed: Nov. 30, 2004

(65) Prior Publication Data

US 2006/0011402 A1 Jan. 19, 2006

Related U.S. Application Data

(63) Continuation-in-part of application No. 10/892,002, filed on Jul. 14, 2004, now Pat. No. 7,188,015.

(51) Int. Cl.
*G05D 1/00* (2006.01)
*B62D 1/24* (2006.01)

(52) U.S. Cl. .................. 180/443; 180/167; 74/494; 701/23; 701/213

(58) Field of Classification Search ................ 180/167, 180/168, 169, 204, 401, 444, 446, 443; 74/494; 701/213, 214, 41, 23
See application file for complete search history.

(56) References Cited

U.S. PATENT DOCUMENTS 2,805,585 A 9/1957 Besserman
3,648,539 A * 3/1972 Rouis .......................... 74/494
3,762,239 A * 10/1973 Rouis .......................... 74/494
3,895,545 A 7/1975 Hunter et al.
4,219,093 A * 8/1980 Lang .......................... 180/401
4,453,485 A * 6/1984 Houghton-Brown et al. ...................... 114/144 A
4,515,221 A * 5/1985 van der Lely ................ 172/3
4,726,175 A * 2/1988 Day et al. ................. 56/10.2 F
5,941,917 A 8/1999 Barnes et al.
6,463,374 B1 * 10/2002 Keller et al. .................. 701/50
6,636,807 B1 * 10/2003 Glasmacher et al. ........ 701/213
2004/0210357 A1 10/2004 McKay et al.

FOREIGN PATENT DOCUMENTS

WO WO 2004/095198 A2 4/2004

OTHER PUBLICATIONS

Harries, G.O., et al., "Automatic Ploughing: A Tractor Guidance System Using Opto-Electronic Remote Sensing Techniques and a Microprocessor Based Controller", (1981), 33-53.

* cited by examiner

*Primary Examiner*—Paul N. Dickson
*Assistant Examiner*—George D Spisich

(57) ABSTRACT

Embodiments of the present invention recite a motor assembly comprising a lower motor mount and an upper motor mount. The lower motor mount is mechanically coupled with a steering column of a mobile machine. The upper motor mount is coupled with the lower motor mount and with a drive motor. The upper motor mount maintains pressure when in a first position such that a drive wheel coupled with the drive motor stays in contact with a steering wheel of a vehicle of a mobile machine. When the upper motor mount is locked in a second position, the drive wheel is kept away from the steering wheel of the mobile machine.

29 Claims, 18 Drawing Sheets

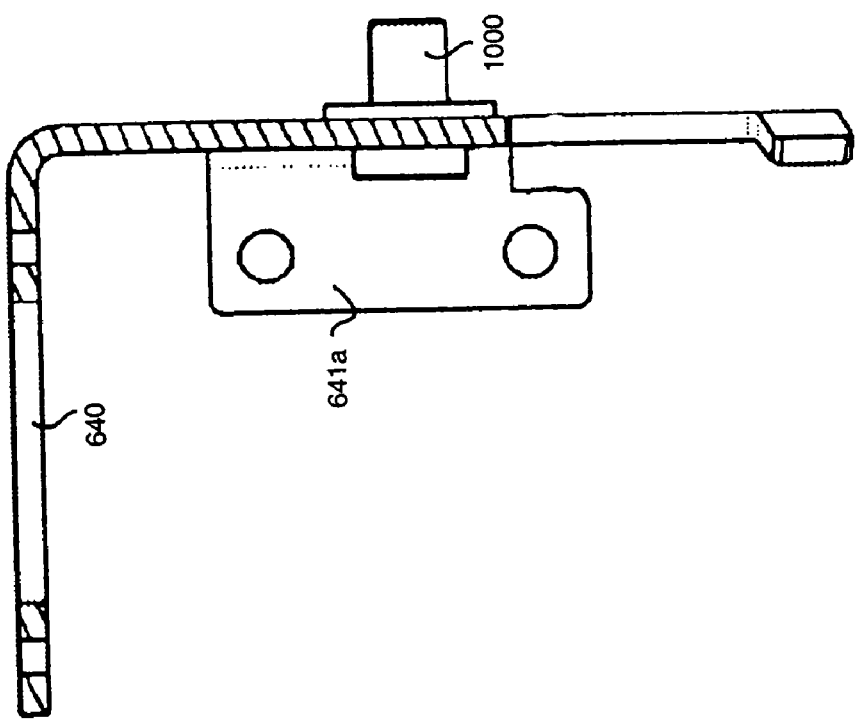

MOTOR MOUNT ASSEMBLY FOR CONTROLLING A MOBILE MACHINE

RELATED APPLICATIONS

The present invention is a continuation in part of and commonly owned U.S.P.T.O. application Ser. No. 10/892,002 filed Jul. 14, 2004 now U.S. Pat. No. 7,188,015 titled A Method and System for Controlling a Mobile Machine by Arthur Lange and James Veneziano, assigned to the assignee of the present invention, and which is hereby incorporated by reference in its entirety herein.

FIELD OF THE INVENTION

Embodiments of the present invention are directed to controlling a mobile machine. More specifically, embodiments of the present invention relate to an assembly for coupling a steering component of a vehicle control system with a mobile machine.

BACKGROUND OF THE INVENTION

Operating agricultural vehicle such as tractors and harvesters often requires highly repetitive operations. For example, when plowing or planting a field, an operator must make repeated passes across a field. Due to the repetitive nature of the work and irregularities in the terrain, gaps and overlaps in the rows of crops can occur. This can result in damaged crops, overplanting, or reduced yield per acre. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human. Many rely upon furrow followers which mechanically detect whether the vehicle is moving parallel to a previously plowed plant furrow. However, these guidance systems are most effective in flat terrain and when detecting furrows plowed in a straight line. Additionally, many of these systems require factory installation and are too expensive or inconvenient to facilitate after market installation.

A component for controlling the steering mechanism of the vehicle is used to control the movement of the vehicle in a desired direction. Thus, the guidance system generates a steering command which is implemented by the component which controls the steering mechanism. Often, the controlling component is directly coupled with and manipulates hydraulic pumps which comprise the power steering system of the vehicle. Other controlling components manipulate the steering wheel of the vehicle.

FIG. 5 shows a side view of an exemplary prior art motor mount 500. In FIG. 5, a electric motor 510 is coupled with a thrust bearing 511. A shaft 520 coupled with motor 510 passes through thrust bearing 511 and is coupled with wheel 521. Thrust bearing 511 is coupled with a back plate 540 via a screw 512 which defines a point of rotation for thrust bearing 511. A screw (not shown) couples spring 590 with back plate 540 which is in turn coupled with, for example, the steering column of the vehicle being controlled. A lever 550 is coupled with back plate 540 via screw which defines a point of rotation for lever 550. A screw 552 extends from lever 550 and overlies electric motor 510.

FIG. 5 shows motor mount 500 in an engaged position in which wheel 521 contacts steering wheel 560. To engage wheel 521 with steering wheel 560, lever 550 is pulled in the direction typically shown as arrow 570. As a result, lever 550 rotates around screw 551, thus causing screw 552 to move over the back of electric motor 510 and engage a groove 513 cut into the housing of electric motor 510. This in turn causes thrust bearing 511 to rotate around screw 512, which results in wheel 521 moving in the direction typically shown as arrow 580 and compressing spring 590. To disengage wheel 521 from steering wheel 560, lever 550 is moved in the opposite direction to disengage screw 552 from groove 513.

Motor mount 500 is problematic in that after repeated use, groove 513 becomes worn such that it becomes difficult for screw 552 to remain engaged in groove 513. As a result, wheel 521 can unintentionally become engaged with steering wheel 560. For example, if a user is manually steering a vehicle and hits a bump, wheel 521 can become engaged with steering wheel 560. This can be especially dangerous if the guidance system is generating steering commands at that moment as the vehicle may be steered in an un-intended direction as a result.

Another drawback of motor mount 500 is that screw 512 uses a lock nut having a nylon insert to maintain a desired amount of tightness. Over time, the nylon insert becomes worn, thus allowing thrust bearing 511 to move out of plane. This results in reduced precision for the guidance system because when electric motor implements steering commands, torque induced by the turning of motor 510 causes the out of plane movement. As a result, friction between wheel 521 and steering wheel 560 is lost which can result in a loss of steering precision.

Additionally, adjustment of the torque applied to screw 512 during assembly necessitates some degree of skill on the part of the assembler. For example, if screw 512 is tightened too much, it becomes too difficult to rotate thrust bearing 511 around the axis defined by screw 512. However, not tightening screw 512 enough introduces a loss of precision as described above. This is further complicated by the nylon inserts themselves which typically exhibit a wide range of tolerance with respect to the amount of torque that can be applied. As a result, the person assembling motor mount 500 has to learn by experience how much torque to apply during assembly.

SUMMARY OF THE INVENTION

Accordingly, a need exists for motor mount for a vehicle controller which minimizes the amount of out of plane movement of the motor with respect to a steering wheel of the vehicle being controlled. While meeting the above stated need, it is advantageous that the motor mount can positively disengage the vehicle controller when desired. While meeting the above stated needs, it is advantageous that the motor mount can be manufactured economically and without requiring specially trained assembly personnel.

Embodiments of the present invention recite a motor assembly comprising a lower motor mount and an upper motor mount. The lower motor mount is mechanically coupled with a steering column of a mobile machine. The upper motor mount is coupled with the lower motor mount and with a drive motor. The upper motor mount maintains pressure when in a first position such that a drive wheel coupled with the drive motor stays in contact with a steering wheel of a vehicle of a mobile machine. When the upper motor mount is locked in a second position, the drive wheel is kept away from the steering wheel of the mobile machine.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIGS. 11A, 11B, and 11C show an exploded perspective, side and rear views respectively of a pivot shaft and upper motor mount in accordance with embodiments of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1A:
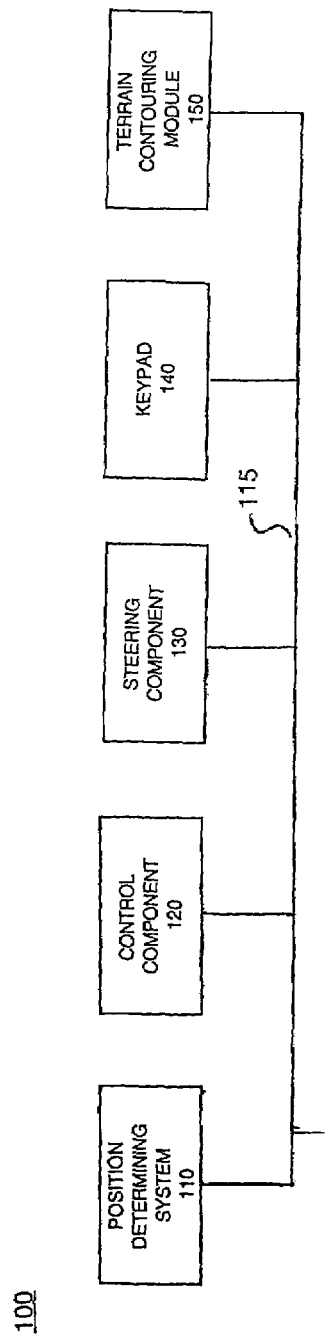
FIGS. 1A and 1B show an exemplary system for controlling a mobile machine in accordance with embodiments of the present invention.
Figure 1B:
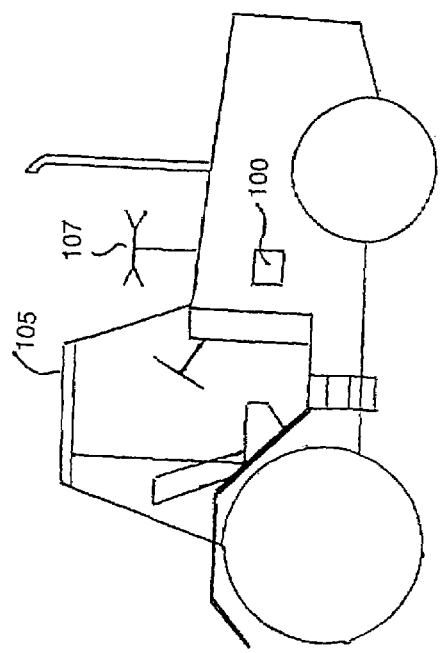

FIG. 1 is a block diagram of an exemplary system 100 for controlling a mobile machine 105 in accordance with embodiments of the present invention. In FIG. 1, a position determining system is coupled with a control component 120 and a steering component 130 via a communication network or coupling 115. Additionally, system 100 may comprise an optional keypad 140 and/or a terrain compensation module component (e.g., TCM 150) which are also coupled with coupling 115.

In embodiments of the present invention, coupling 115 is a serial communications bus. In one embodiment, coupling 115 is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture.

Position determining system 110 determines the geographic position of mobile machine 105. For the purposes of the present invention, the term "geographic position" means the determining in at least two dimensions (e.g., latitude and longitude), the location of mobile machine 105. In one embodiment of the present invention, position determining system 110 is a satellite based position determining system and receives navigation data from satellites via antenna 107 of FIG. 1B. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, or the Galileo system currently under development.

In embodiments of the present invention, control component 120 receives position data from position determining system 110 and generates commands for controlling mobile machine 105. In embodiments of the present invention, mobile machine 105 is an agricultural vehicle such as a tractor, a harvester, etc. However, embodiments of the present invention are well suited for controlling other vehicles such as snow plows, road salting, or roadside spraying equipment as well. In one embodiment, in response to position data received from position determining system 110, control component 120 generates a message (e.g., a steering command) to steering component 130 which then controls the steering mechanism of mobile machine 105. In embodiments of the present invention, control component 120 is operable for generating steering commands to an electrical steering component and a hydraulic steering component depending upon the configuration of system 100.

In embodiments of the present invention, keypad 130 provides additional input/output capabilities to system 100. In embodiments of the present invention, keypad 130 may also comprise a device drive which allows reading a media storage device such as a compact disk (CD), a digital versatile disk (DVD), a memory stick, or the like. This allows, for example, integrating data from various software applications such as mapping software in order to facilitate controlling the movement of mobile machine 105. For example, field boundaries can be easily input into system 100 to facilitate controlling the movement of mobile machine 105.

TCM 150 provides the ability to compensate for terrain variations which can reduce the precision of position determining system 110 in determining the geographic position of mobile machine 105. For example, when traversing a hillside, the antenna 107 of the position determining system 110 can be displaced to one side or the other with respect to the center line of mobile machine 105, thus causing errors in determining the geographic position of mobile machine 105. As a result, gaps or overlaps can occur when plowing across contoured terrain is being performed. TCM 150 can detect the magnitude of displacement of antenna 107 with respect to the center line of mobile machine 105 (e.g., due to roll, pitch, and yaw) and send signals which allow control component 120 to generate steering commands which compensate for the errors in determining the geographic position of mobile machine 105. It is appreciated that the components described with reference to FIG. 1 may be implemented as separate components. However, in embodiments of the present invention, these components may be integrated as various combinations of discreet components, or as a single device.

Figure 2:
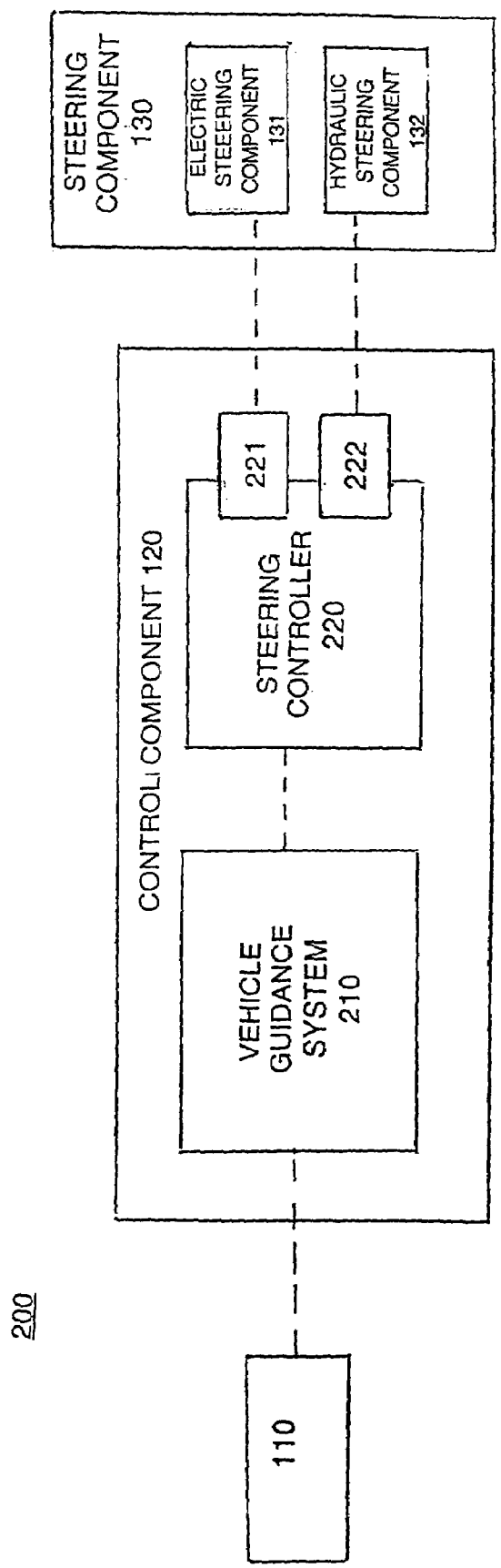
FIG. 2 shows an exemplary system architecture in accordance with embodiments of the present invention.

FIG. 2 shows an exemplary system architecture 200 in accordance with embodiments of the present invention. In the embodiment of FIG. 2, control component 120 comprises a vehicle guidance system 210 which is coupled with a steering controller 220. It is appreciated that in embodiments of the present invention, vehicle guidance system 210 and steering controller 220 may be implemented as a single unit, or separately. Implementing steering controller 220 separately is advantageous in that it facilitates implementing the present invention as an after market kit which can be easily added to an existing vehicle navigation system. As a result, the costs for components and for installation of the control system of the present invention are reduced. However, embodiments of the present invention are well suited to be factory installed as original equipment for mobile machine 105 as well.

In embodiments of the present invention, vehicle guidance system 210 uses position data from position determining system 110, user input such as a desired pattern or direction, as well as vector data such as desired direction and distance to determine course corrections which are used for guiding mobile machine 105. Roll, pitch, and yaw data from TCM 150 may also be used to determine course corrections for mobile machine 105. For purposes of the present invention, the term "course correction" means a change in the direction traveled by mobile machine 105 such that mobile machine 105 is guided from a current direction of travel to a desired direction of travel. In embodiments of the present invention, vehicle guidance system 210 is a commercially available guidance system such as the AgGPS® guidance system manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, vehicle guidance system 210 may generate steering commands which cause mobile machine 105 to move 15 feet to one side in the next pass. Vehicle guidance system 210 may also be programmed to follow straight or curved paths which is useful when operating in irregularly shaped or contoured fields or in fields disposed around a center pivot. This is also useful in situations in which the path being followed by mobile machine 105 is obscured. For example, an operator of a snowplow may not be able to see the road being cleared due to the accumulation of snow on the road. Additionally, visibility may be obscured by snow, rain, or fog. Thus, it would be advantageous to utilize embodiments of the present invention to guide mobile machine 105 in these conditions. In embodiments of the present invention, position determining component 110 may be integrated into vehicle guidance system 210 or may be a separate unit. Additionally, as stated above with reference to FIG. 1, position determining component 110, control component 120 and steering component 130 may be integrated into a single unit in embodiments of the present invention.

In embodiments of the present invention, the course correction calculated by vehicle guidance system 210 is sent from vehicle guidance system 210 to steering controller 220.

Steering controller 220 translates the course correction generated by guidance system 210 into a steering command for manipulating the steering mechanism of mobile machine 105. Steering controller 220 generates a message conveying the steering command to steering component 130. In embodiments of the present invention, the communicative coupling between vehicle guidance system 210, steering controller 220 and steering component 130 is accomplished using coupling 115 (e.g., a serial bus, or CAN bus).

In embodiments of the present invention, steering component 130 may comprise an electric steering component 131, or a hydraulic steering component 132. Thus, as shown in FIG. 2, steering controller 220 comprises a first output 221 for coupling steering controller 220 with electric steering component 131, and a second output 222 for coupling steering controller 220 with hydraulic steering component 132. Because coupling 115 may be compliant with the CAN protocol, plug and play functionality is facilitated in system 200. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 131. If steering controller 220 determines that output 222 is being used, it generates a steering command which is formatted for controlling hydraulic steering component 132.

Figure 3B:
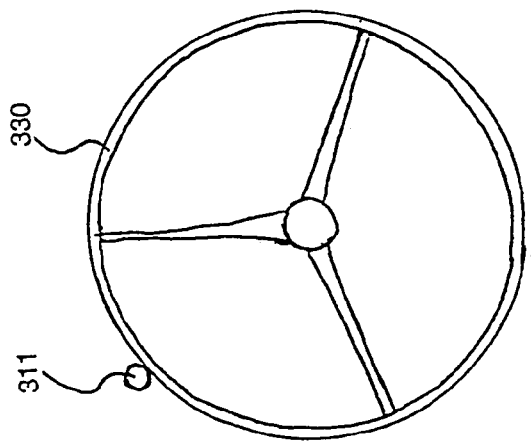
FIGS. 3A and 3B show side and top views respectively of a system for controlling a mobile machine in accordance with embodiments of the present invention.
Figure 3A:
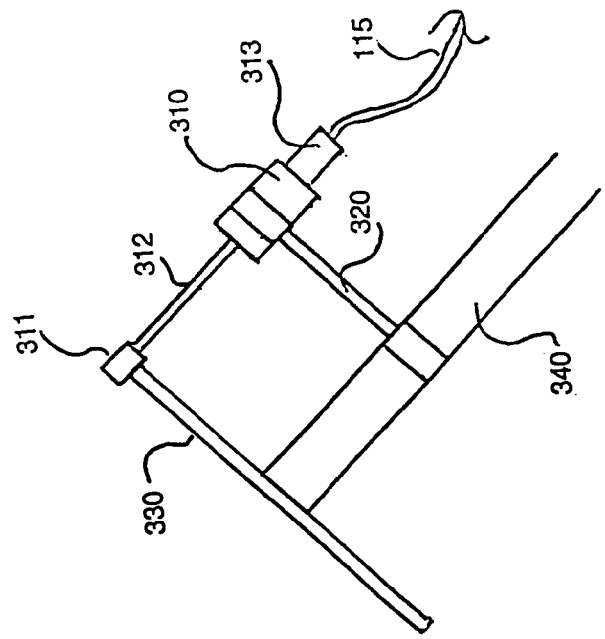

FIGS. 3A and 3B show side and top views respectively of a system 300 for controlling a mobile machine in accordance with embodiments of the present invention. In the embodiment of FIG. 3A, a steering component (e.g., electric steering component 131 of FIG. 2) comprises an electric motor 310 which is coupled with an actuator device via a shaft 312. In the embodiment of FIG. 3A, actuator device comprises a drive wheel 311 which is in contact with steering wheel 330 of mobile machine 105. In embodiments of the present invention, electric motor 310 may be directly coupled with drive wheel 311, or may be coupled via a low ratio gear (not shown). Using these methods to couple electric motor 313 and drive wheel 311 are advantageous in that a smaller electric motor can be used while still generating sufficient torque to control steering wheel 330. Thus, if a user wants to manually steer mobile machine 105, the user will encounter less resistance from electric motor 310 when it is disengaged.

In embodiments of the present invention, the electric motor coupled with drive wheel 311 is a non-geared motor and the performance parameters of the electric motor coupled are selected so that, for example, electric motor 310 may be installed in a variety of vehicle types and/or manufacturers. For example, a certain amount of torque is desired in order to be able to turn steering wheel 330. It is also important to determine a desired ratio between the torque generated by the motor and the electrical current driving the motor. Because there is a power loss across the transistors comprising control component 120 that are proportional to the square ($X^2$) of the current passing through the circuit, it is desirable to utilize a lower amount of current. However, if too little current is used, the motor turns too slowly to provide a desired level of responsiveness to steering commands. Additionally, if the torque constant (e.g., ounce/inches per amp) is too high, excessive "back-EMF," which is an electro-magnetic field, is generated by the motor and interferes with the current flowing into the motor. While a higher voltage can overcome the back-EMF issue, most vehicles utilize 12 volt batteries, thus indicating that a higher amount of current is desired. In embodiments of the present invention, a non-geared electric motor which generates approximately nineteen ounce/inches of torque per amp of current is utilized. In other embodiments of the present invention, the performance parameters of the electric motor are selected to more specifically match the motor with a particular vehicle type, model, or manufacturer.

Electric steering component 131 further comprises a motor control unit 313 is coupled with electric motor 310 and with a control component 120 of FIG. 2 via coupling 115. In FIG. 3A, electric motor 310 is coupled with the steering column 340 via a bracket 320. It is appreciated that in embodiments of the present invention, electric motor 310 may be coupled with steering column 340 using another apparatus than bracket 320. For example, in one embodiment, electric motor 310 may be coupled with a bracket which is attached via suction cups with the windshield or dashboard of mobile machine 105. In another embodiment, electric motor 310 may be coupled with a pole which is extended between the floor and roof of mobile machine 105. Furthermore, while the present embodiment shows motor control unit 313 directly coupled with electric motor 310, embodiments of the present invention are well suited to utilize other configurations. For example, in one embodiment motor control unit 313 may be implemented as a sub-component of control unit 120 and may only send a control voltage to electric motor 310 via an electrical coupling (not shown). In another embodiment, motor control unit 313 may be implemented as a separate unit which is communicatively coupled with control unit 120 via coupling 115 and with electric motor 310 via an electrical coupling (not shown).

In embodiments of the present invention, drive wheel 311 is coupled with steering wheel 330 with sufficient friction such that rotation of drive 311 causes rotation of steering wheel 330. In embodiments of the present invention, a spring (not shown) maintains sufficient pressure for coupling drive wheel 311 with steering wheel 330. However, the spring does not maintain sufficient pressure between drive wheel 311 and steering wheel 330 to pinch a user's fingers if, for example, the user is manually steering mobile machine 105 and the user's fingers pass between drive wheel 311 and steering wheel 330. While the embodiment of FIGS. 3A and 3B show drive wheel 311 contacting the outside portion of steering wheel 330, in other embodiments of the present invention, drive wheel 311 contact the inside portion of steering wheel 330.

In embodiments of the present invention, electric motor 310 is reversable, thus, depending upon the steering command sent from control component 120, motor control unit 313 controls the current to electric motor 310 such that it rotates in a clockwise of counter-clockwise direction. As a result, steering wheel 330 is turned in a clockwise or counter-clockwise direction as well. Typically, the current running through electric motor 310 is calibrated so that drive wheel 311 is turning steering wheel 330 without generating excessive torque. This facilitates allowing a user to override electric steering component 131. In embodiments of the present invention, electric motor 310 may be a permanent magnet brush direct current (DC) motor, a brushless DC motor, a stepper motor, or an alternating current (AC) motor.

In embodiments of the present invention, motor control unit 313 can detect when a user is turning steering wheel 330 in a direction counter to the direction electric steering component 131 is turning. For example, a shaft encoder (not shown) may be used to determine which direction shaft 312 is turning. Thus, when a user turns steering wheel 330 in a direction which counters the direction electric motor 310 is turning, the shaft encoder detects that the user is turning steering wheel 330 and generates a signal to motor control unit 313. In response to determining that a user is turning steering wheel 330, motor control unit 313 can disengage the power supplied to electric motor 310. As a result, electric motor 310 is now freewheeling and can be more easily operated by the user. In another embodiment, motor control unit 313 when steering wheel 330 is turned counter to the direction electric motor is turning, a circuit in motor control unit 313 detects that electric motor 310 is stalling and disengages the power supplied to electric motor 310. In another embodiment, a switch detects the rotation of steering wheel 330 and sends a signal to motor control unit 313. Motor control unit 313 can then determine that the user is manually steering mobile machine 105 and disengage electric motor 310. As a result, when a user turns steering wheel 330, their fingers will not be pinched if they pass between drive wheel 311 and steering wheel 330 because electric motor 310 is freewheeling when the power is disengaged.

Embodiments of the present invention are advantageous over conventional vehicle control systems in that it can be easily and quickly installed as an after market kit. For example, conventional control systems typically control a vehicle using solenoids and hydraulic flow valves which are coupled with the power steering mechanism of the vehicle. These systems are more difficult to install and more expensive than the above described system due to the higher cost of the solenoids and hydraulic flow valves as well as the additional labor involved in installing the system. The embodiment of FIG. 3 can be easily bolted onto steering column 340 and coupled with steering controller 220. Additionally, electric motor 310 can be fitted to a variety of vehicles by simply exchanging bracket 320 for one configured for a particular vehicle model. Furthermore, embodiments of the present invention do not rely upon furrow feelers which typically must be raised from and lowered into a furrow when the end of the furrow is reached. As a result, less time is lost in raising or lowering the furrow feeler.

Figure 4B:
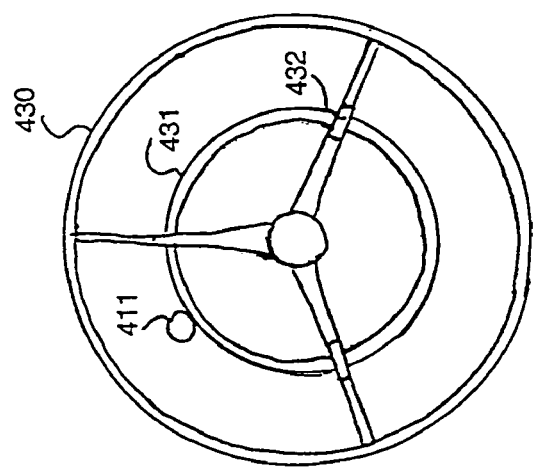
FIGS. 4A and 4B show side and top views respectively of a system for controlling a mobile machine in accordance with embodiments of the present invention.
Figure 4A:
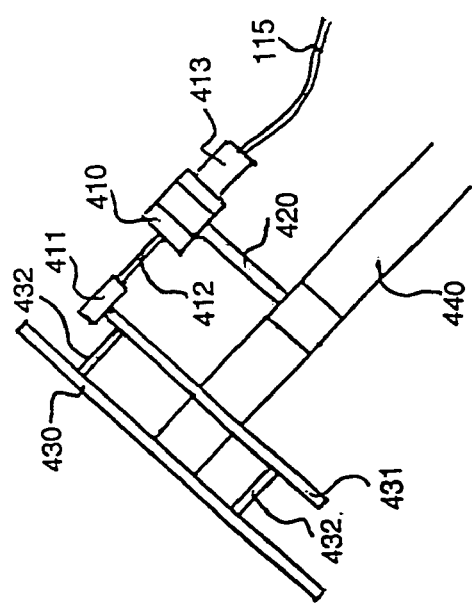

FIGS. 4A and 4B show side and top views respectively of a system 400 for controlling a mobile machine in accordance with embodiments of the present invention. In FIG. 4A, the steering component (e.g., electric steering component 131 of FIG. 2) comprises an electric motor 410 which is coupled with drive wheel 411 via shaft 412 and a motor control unit 413. Motor control unit 413 couples electric motor 410 with steering controller 220 of FIG. 2. In FIG. 4A, electric motor 410 is with steering column 440 via bracket 420. In the embodiment of FIGS. 4A and 4B, drive wheel 411 is coupled with a sub wheel 431 which is coupled with steering wheel 330 via brackets 432.

In the embodiment of FIGS. 4A and 4B, electric motor 410 turns in a clockwise or counter-clockwise direction depending upon the steering command received by motor control unit 413. As a result, drive wheel 411 causes sub wheel 431 to turn in clockwise or counter clockwise direction as well. Utilizing sub wheel 431 prevents a user's fingers from being pinched between steering wheel 430 and drive wheel 411 if the user chooses to manually steer the vehicle. In embodiments of the present invention, sub wheel 431 can be easily and quickly coupled with steering wheel 430 by, for example, attaching brackets 432 to the spokes of steering wheel 430.

Motor Mount Embodiment of the Present Invention

Figure 6:
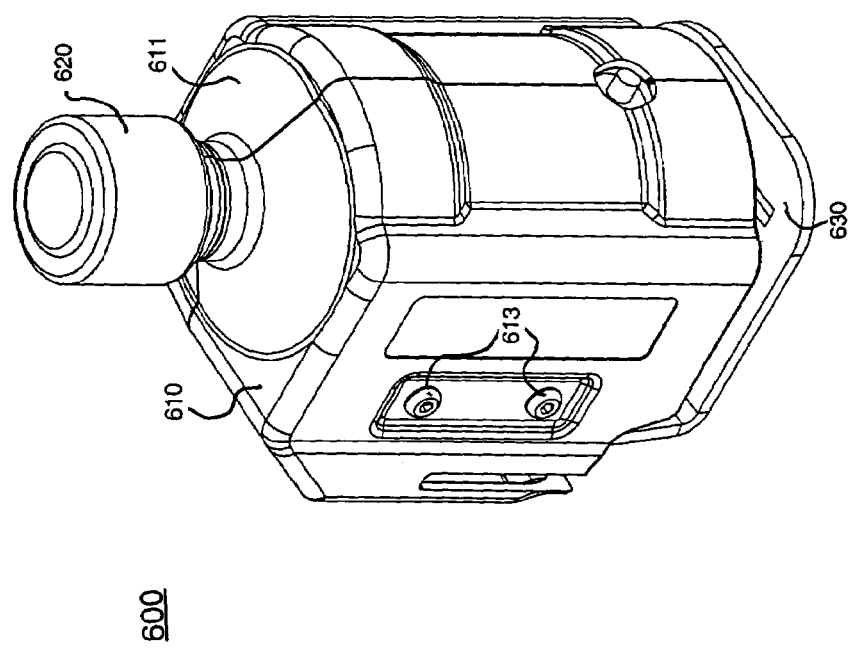
FIG. 6 shows a perspective view of a motor mount assembly 600 in accordance with embodiments of the present invention.

FIG. 6 shows a perspective view of a motor mount assembly 600 in accordance with embodiments of the present invention. FIG. 6 shows a fully assembled motor mount assembly in which a right side cover 610 and a left side cover 611 are coupled with an upper motor mount (not shown) using cover screws (e.g., 613). Right side cover 610 and left side cover 611 prevent users from getting their fingers caught in the mechanism of the motor mount, protect the drive motor, and present a less cluttered appearance to the user. Extending from the top of motor mount assembly 600 is a drive wheel 620. In embodiments of the present invention, drive wheel 620 controls the movement of the steering wheel of a vehicle in response to steering command from, for example, steering controller 220. A slot in the side of right side cover 610 permits lower motor mount 630 to extend outside of the cover when the upper motor mount is moved with respect to lower motor mount 630.

Figure 7:
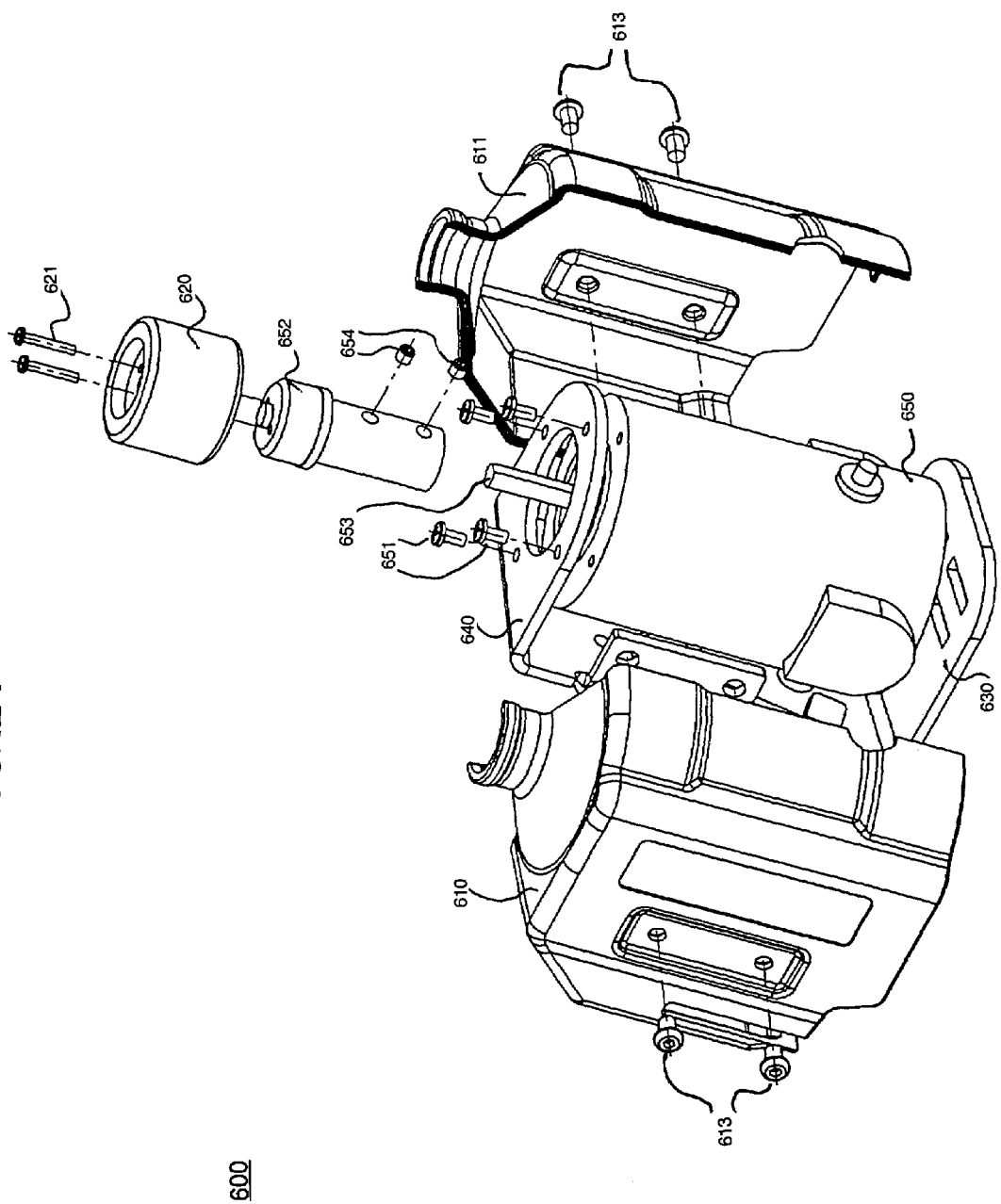
FIG. 7 is an exploded perspective view of a motor mount assembly in accordance with embodiments of the present invention.

FIG. 7 is an exploded perspective view of a motor mount assembly 600 in accordance with embodiments of the present invention. As shown in FIG. 7, right side cover 610 and left side cover 611 are coupled with upper motor mount 640 using cover screws 613. Drive motor 650 is coupled with upper motor mount 640 using motor mount screws 651. A drive shaft 652 is coupled with motor shaft 653 using shaft screws 654. Drive shaft 652 is coupled with drive wheel 620 using drive wheel screws 621. In embodiments of the present invention, a cap (not shown) can be inserted into drive wheel 620 to cover drive wheel screws 621.

Figure 8A:
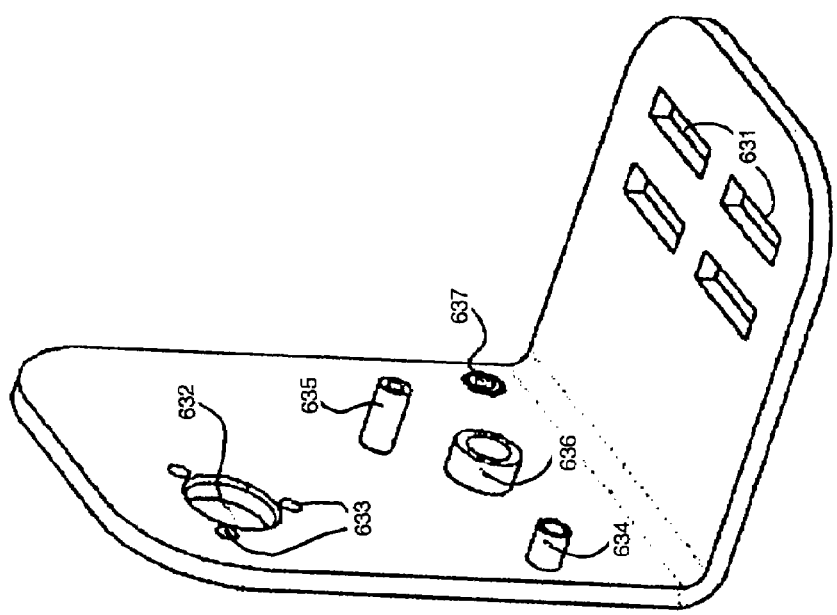
FIGS. 8A, 8B, and 8C show front, top, and perspective views respectively of a lower motor mount in accordance with embodiments of the present invention.
Figure 8C:
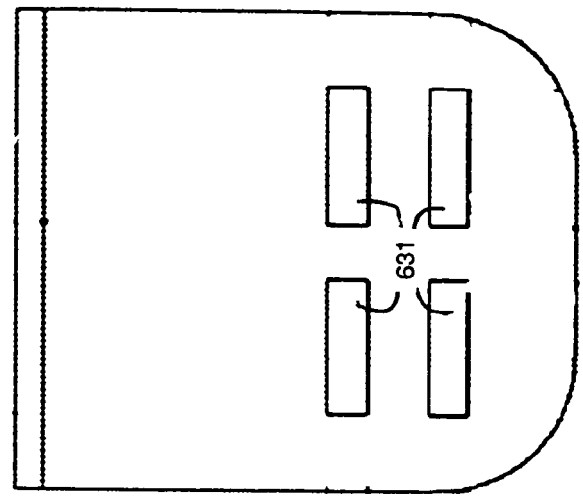
Figure 8B:
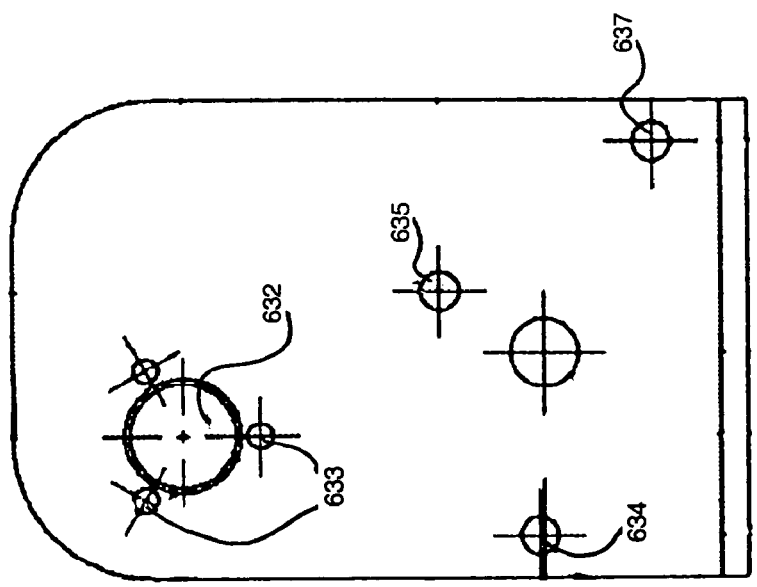

FIGS. 8A, 8B, and 8C show perspective, front, and top views respectively of a lower motor mount 630 in accordance with embodiments of the present invention. In embodiments of the present invention, lower motor mount 630 comprises a plurality of mounting holes 631. In the present embodiment, mounting holes 631 have a squared configuration, however in other embodiments of the present invention, a more conventional rounded configuration may be implemented. The squared configuration shown in FIGS. 8A and 8C are advantageous because they facilitate mounting coupling lower motor mount 630 to, for example, the steering column of a vehicle using only one wrench. For example, square-necked carriage bolts (not shown) may be inserted into mounting holes 631 and coupled with a bracket (not shown) to couple lower motor mount 630 to the steering column of a vehicle. If mounting holes 631 had a rounded configuration, two wrenches and/or screwdrivers would be needed to securely mount lower motor mount 630.

Lower motor mount 630 further comprises a bearing hole 632 which is surrounded by a plurality of bearing mounting holes (e.g., typically shown as 633). Lower motor mount 630 further comprises first positive stop 634 and 635 and latching pin bushing 636. In embodiments of the present invention, first positive stop 634 and/or second positive stop 635 may be removably coupleable with lower motor mount 630. For example, first positive stop 634 may comprise a threaded portion which is screwed into a threaded hole in lower motor mount 630. Finally, lower motor mount 630 comprises a spring mounting hole 637.

Referring now to FIG. 8B, which shows a front view of lower motor mount 630 without first positive stop 634, second positive stop 635, and latch pin bushing 636 inserted. In embodiments of the present invention, lower motor mount 630 can be fabricated at a low cost and without requiring specialized fabricating equipment. For example, lower motor mount 630 may be fabricated out of sheet metal which is simply cut and folded. Furthermore, there is no requirement for dimension tolerances for bearing hole 632, bearing mounting holes 633, spring mounting hole 637, and/or the holes for first positive stop 634, second positive stop 635, and the hole for latch pin bushing 636. As a result, in embodiments of the present invention, these holes can be simple drilled or punched through the metal sheet comprising lower motor mount 630.

FIGS. 9A, 9B, 9C, 9D, and 9E show front, side, bottom, top, and rear views respectively of an upper motor mount 640 in accordance with embodiments of the present invention. In the present embodiment, top motor mount 640 comprises an integrated latching lever 641, pivot shaft mounting hole 642, and spring mounting hole 643. In embodiments of the present invention, integrated latching lever 641 is for restricting the range of motion of upper motor mount 640 when coupled with lower motor mount 630. Integrated latching lever 641 is also for engaging a latching pin inserted into latching pin bushing 636 to keep a drive wheel of the motor mount assembly (e.g., 620 of FIG. 6) away from a steering wheel when upper motor mount is locked in a disengaged position. In embodiments of the present invention, a portion of integrated latching lever 641 is bent to create a lead-in ramp 641a. In embodiments of the present invention, lead-in ramp 641a facilitates locking upper motor mount 640 in a disengaged position.

For example, a spring mounted latching pin is coupled in latch pin housing 636 in embodiments of the present invention. To lock upper motor mount 640 in a disengaged position, a user can simply rotate upper motor mount 640 relative to lower motor mount 630 so that lead-in ramp 641a depresses the spring mounted latching pin. After upper motor mount 640 has been rotated sufficiently to disengage drive wheel 620, integrated latching lever is moved to a position where the latching pin is again able to extend past integrated latching lever 641. When the user releases upper motor mount 640, pressure exerted by a spring causes upper motor mount 640 to return to a position where integrated latching lever 641 engages the latching pin in the cutout region 641b.

Figure 9B:
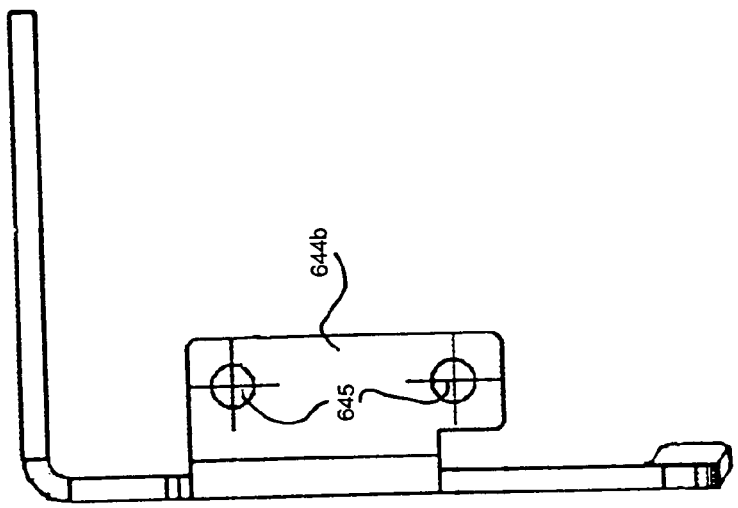
FIGS. 9A, 9B, 9C, 9D, and 9E show front, side, top, bottom, and rear views respectively of an upper motor mount in accordance with embodiments of the present invention.
Figure 9A:
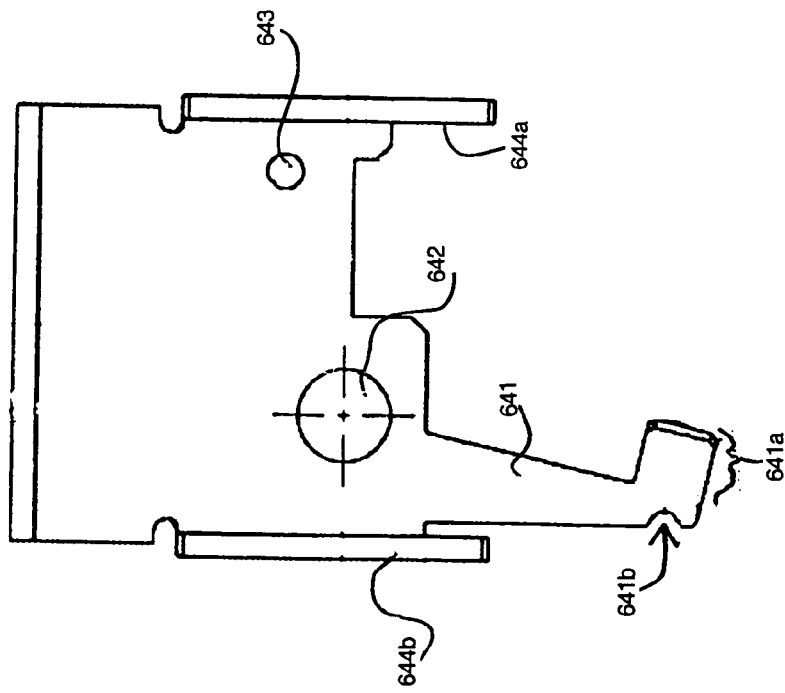
Figure 9D:
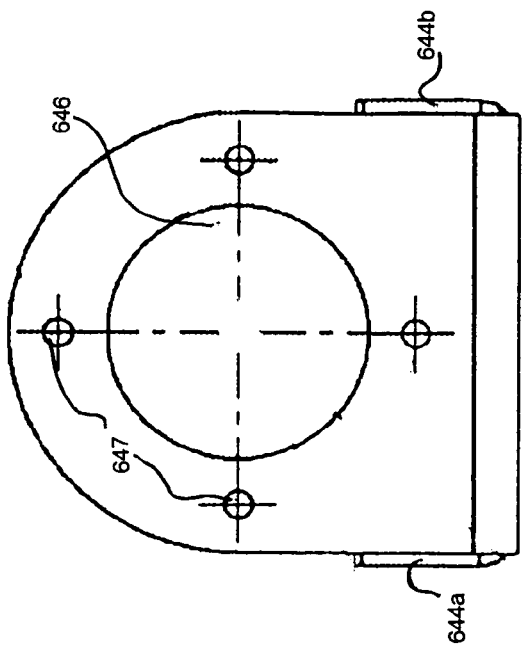

In embodiments of the present invention, upper motor mount 640 further comprises cover mounting brackets 644 (e.g., left side cover bracket 644a and right side cover bracket 644b). With reference to FIG. 9B, embodiments of the present invention further comprise cover mounting holes 645 which are disposed in the cover mounting brackets 644. As shown in FIG. 9B, cover mounting holes 645 are disposed in right side cover mounting bracket 644b. FIG. 9B also shows the portion of lead-in ramp 641a which is bent above the plane of integrated latching lever 641.

Figure 9C:
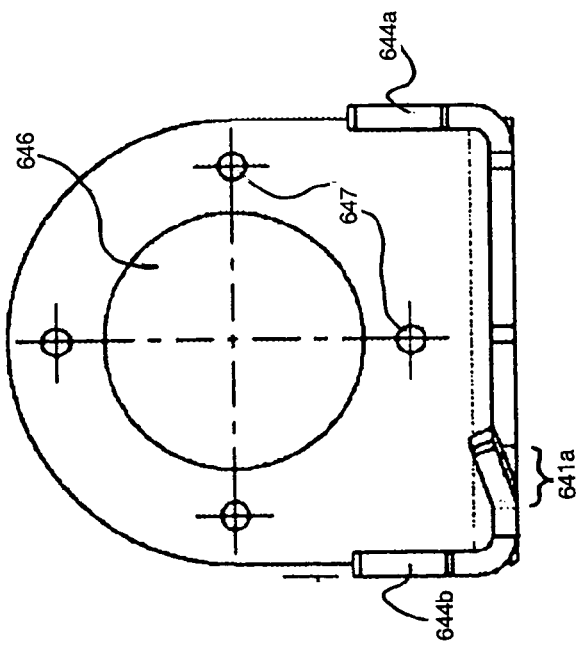
Figure 9E:
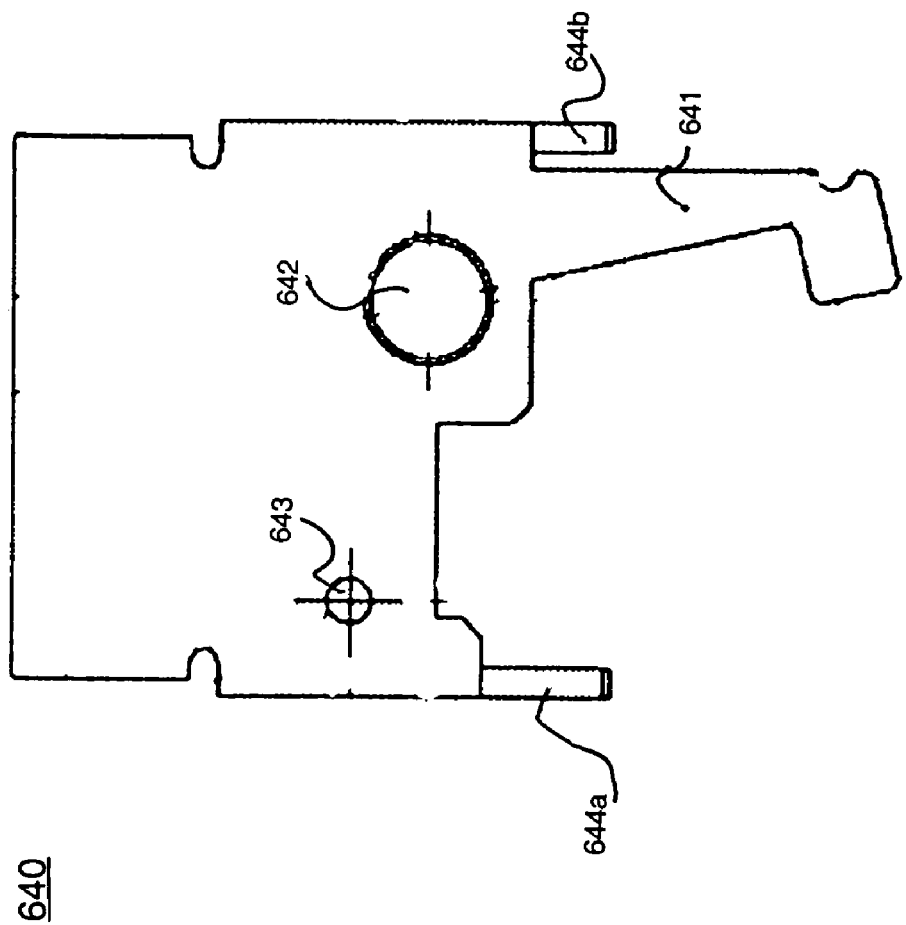

FIG. 9C is a bottom view of upper motor mount 640 showing a motor shaft hole 646 and a plurality of motor mounting holes 647. In embodiments of the present invention, drive motor 650 is coupled with upper motor mount 640 using motor mount screws 651 which are inserted into motor mounting holes 647. In embodiments of the present invention, motor mounting holes 647 may be threaded to mechanically couple drive motor 650 to upper motor mount 640. Motor shaft hole 646 if for letting mort shaft 653 to pass through upper motor mount 640.

In embodiments of the present invention, upper motor mount 640 can be fabricated at a low cost and without requiring specialized fabricating equipment. For example, upper motor mount 640 may be fabricated out of sheet metal which is simply cut and folded. Furthermore, there is no requirement for dimension tolerances for pivot shaft mounting hole 642, spring mounting holes 645, motor shaft hole 646, or motor mounting holes 647. As a result, in embodiments of the present invention, these holes can be simple drilled or punched through the metal sheet comprising upper motor mount 640. However, in embodiments of the present invention, these hole may be threaded to accept threaded screws.

Figure 10B:
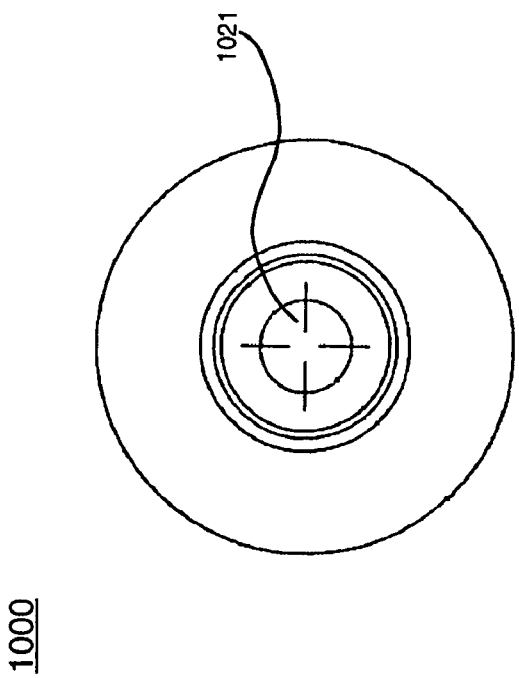
FIGS. 10A and 10B show side and front views respectively of a pivot shaft in accordance with embodiments of the present invention.
Figure 10A:
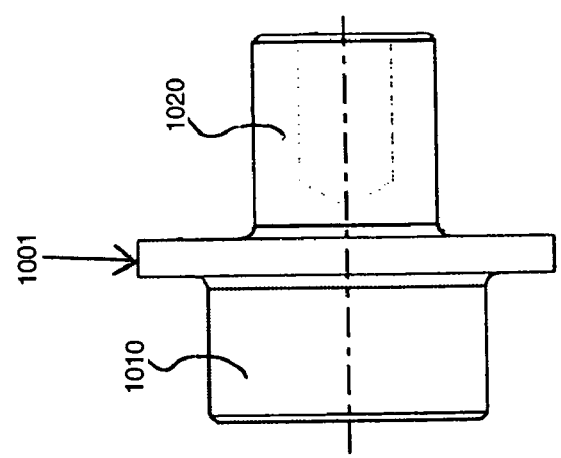

FIGS. 10A and 10B show side and front views respectively of a pivot shaft 1000 in accordance with embodiments of the present invention. In embodiments of the present invention, pivot shaft 1000 is made of stainless steel or another material which is not likely to deform significantly during normal usage of motor mount assembly 600. Furthermore, pivot shaft 1000 typically is not painted anodized, or otherwise coated with a material. As will be discussed in detail below, this facilitates greater precision in the fabrication of motor mount assembly 600 as tolerances for paint build up do not have to be accounted for during the manufacturing process. However, in embodiments of the present invention, paint may be deposited on the area typically shown as 1001 around the circumference of pivot shaft 1000 without significantly affecting the precision of motor mount assembly 600.

In the embodiment of FIG. 10, pivot shaft 1000 comprises a first pin 1010 and a second pin 1020. In embodiments of the present invention, first pin 1010 is inserted into pivot shaft mounting hole 642 of upper motor mount 640 and pivot shaft 1000 is then welded or otherwise coupled with upper motor mount 640 In embodiments of the present invention, second pin 1020 is drilled and threaded to accept a screw in cap screw hole 1021. Second pin 1020 is then inserted into a pivot bearing (e.g., pivot bearing 1201 of FIG. 12) which has been fit into bearing hole 632 of lower motor mount 630 and coupled therewith using screws inserted into bearing mounting holes 633. In embodiments of the present invention, second pin 1020 defines a point of rotation for upper motor mount 640.

Figure 11B:
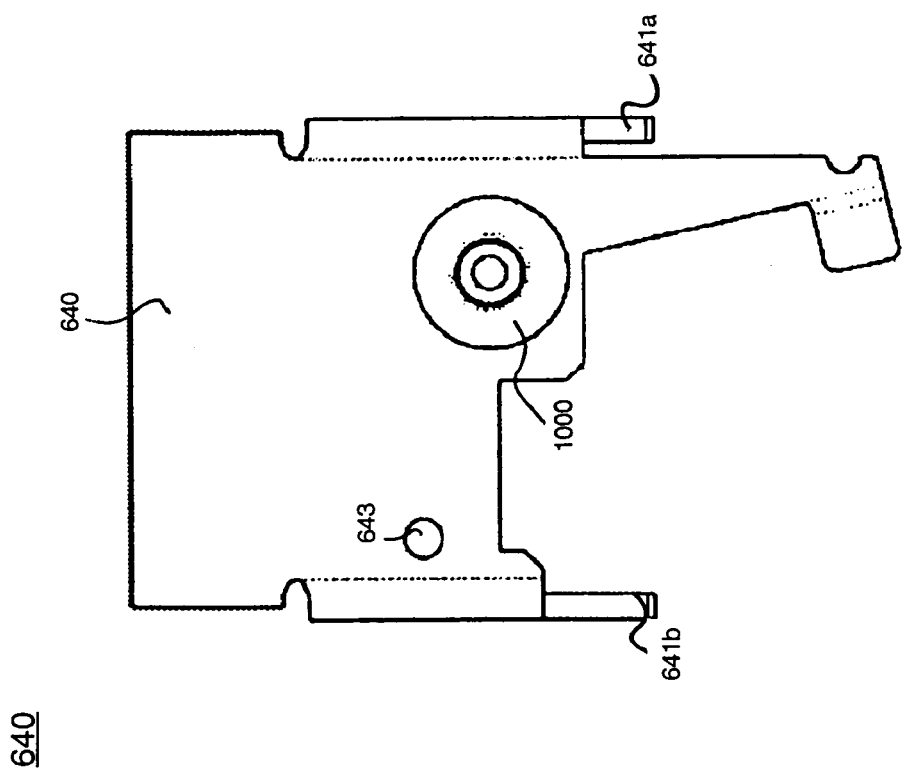
Figure 11A:
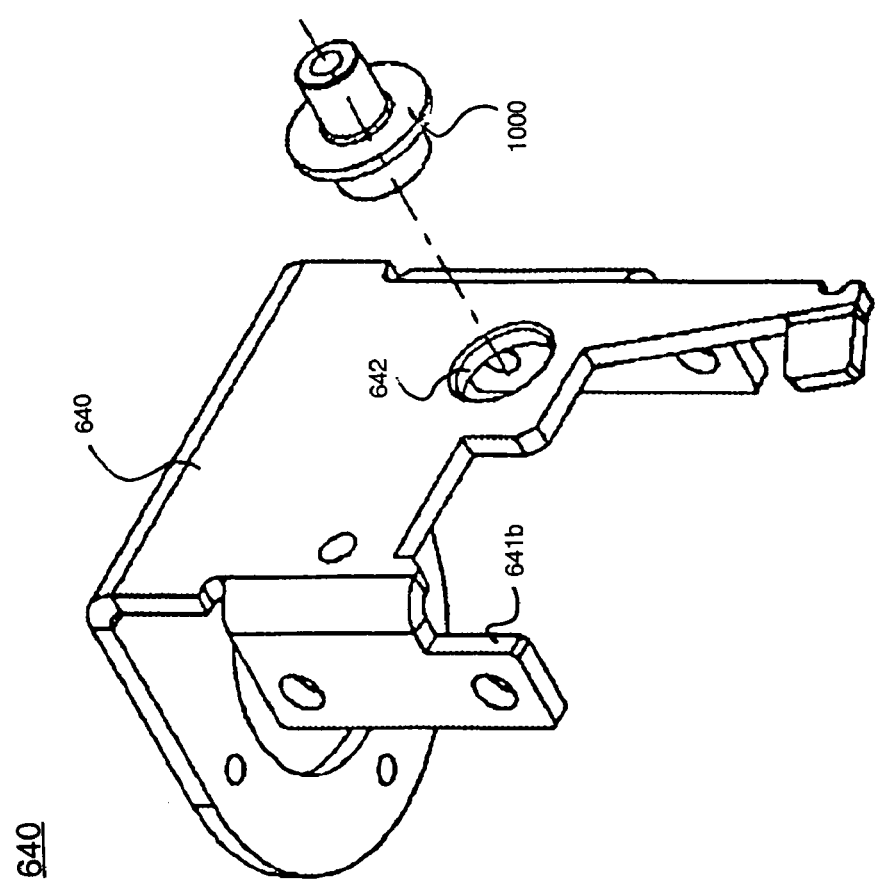

FIGS. 11A, 11B, and 11C show an exploded perspective, side and rear views respectively of a pivot shaft 1000 and upper motor mount 640 in accordance with embodiments of the present invention. As discussed above with reference to FIG. 10, in embodiments of the present invention, pivot shaft 1000 is inserted into pivot shaft mounting hole 642 of upper motor mount 640. In embodiments of the present invention, pivot shaft 1000 is then coupled with upper motor mount 640 by, for example, welding or bolting them together.

Figure 12:
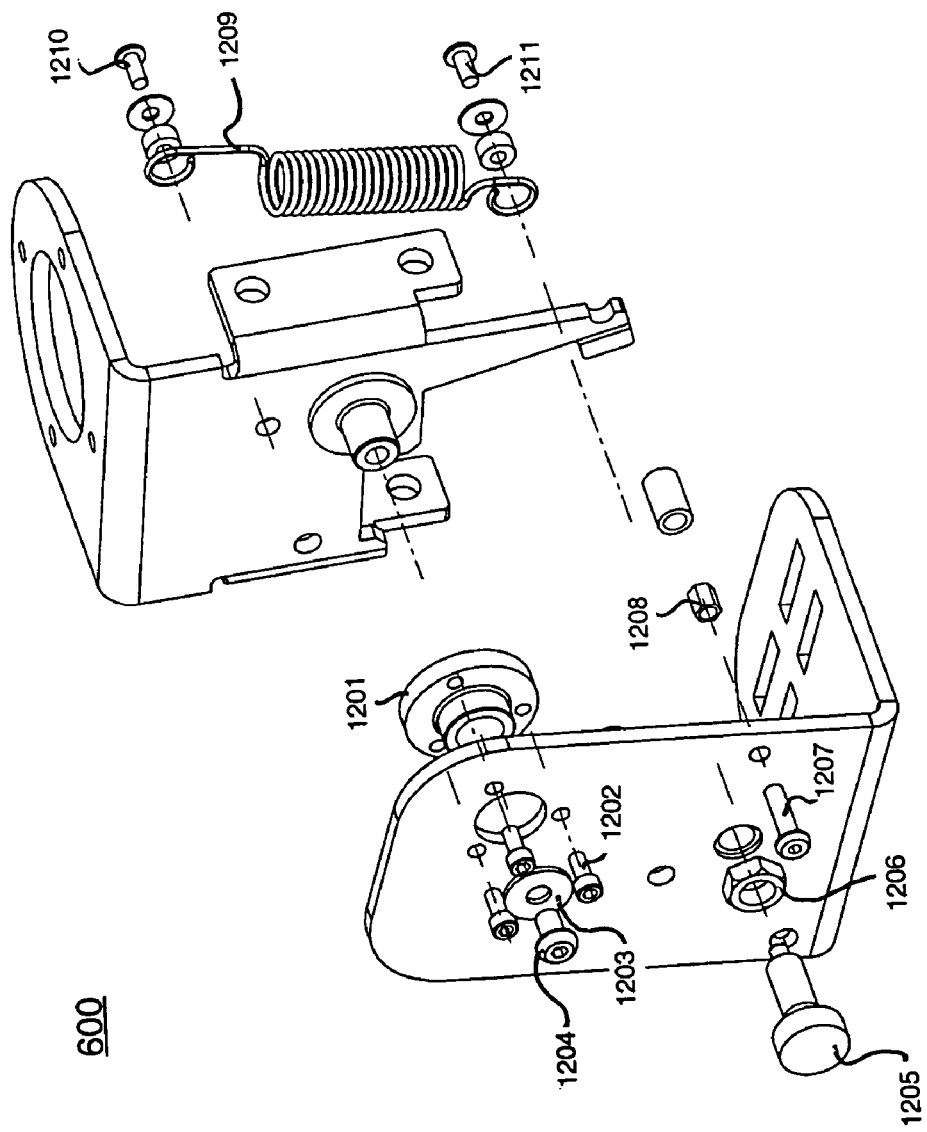
FIG. 12 is an exploded perspective view of upper motor mount and lower motor mount in accordance with embodiments of the present invention.

FIG. 12 is an exploded perspective view of upper motor mount 630 and lower motor mount 640 in accordance with embodiments of the present invention. In FIG. 12, upper motor mount 640 is shown with pivot shaft 1000 already coupled therewith. Also shown in FIG. 12 is pivot bearing 1201 which is inserted into bearing hole 632 of lower motor mount 630 and coupled therewith using bearing mounting screws 1202. Also shown in FIG. 12 is a washer 1203 and cap screw 1204. During assembly, pivot shaft 1000 is inserted into pivot bearing 1201 and cap screw 1204 is inserted through washer 1203 and screwed into cap screw hole 1021 of pivot bearing 1000. As a result, upper motor mount 640 and lower motor mount 630 are coupled while still allowing rotation of upper motor mount 640 with relation to lower motor mount 630 around the axis defined by pivot shaft 1000.

Also shown in FIG. 12 is latch pin 1205 which is coupled with lower motor mount 630 using a nut 1206. In embodiments of the present invention, latch pin 1205 is a spring loaded latch pin which is typically extended in the direction toward upper motor mount 640 unless it is moved by a user. First positive stop 634 is shown which is coupled with lower motor mount 630 using screw 1207 and nut 1208. A spring 1209 is coupled with upper motor mount 640 using a screw 1210 which is screwed into spring mounting hole 643. The other end of spring 1209 is coupled with lower motor mount 630 using a screw 1211 which is screwed into spring mounting hole 637.

Figure 5:
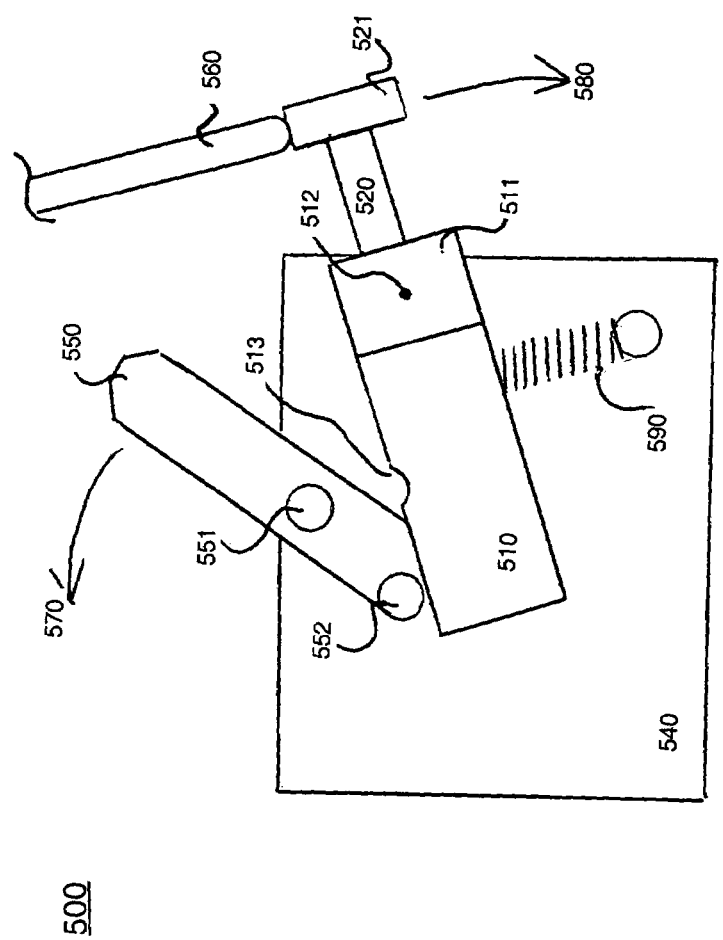
FIG. 5 shows a side view of an exemplary prior art motor mount.

In embodiments of the present invention, there is no requirement for experienced or specially trained assemblers to assemble motor mount assembly 600. For example, in embodiments of the present invention, each of the screws shown in FIG. 12 can simply be tightened to a pre-determined amount of torque. As discussed above with reference to FIG. 5, in prior art motor mounts, a well trained assembler was needed to tighten screw 512 enough to allow rotation of thrust bearing 511 without permitting excessive out of plane movement. In embodiments of the present invention, out of plane movement is limited by the design of pivot shaft 1000 and pivot bearing 1201. Thus, there is no requirement for an assembler with special training or skills to assemble motor mount assembly 600. As a result, additional savings in the manufacture of motor mount assembly 600 can be realized. Additionally, because embodiments of the present invention can more effectively control out of plane movement of driving wheel 620, more precision in the steering of a vehicle (e.g., 105) is realized.

Figure 13:
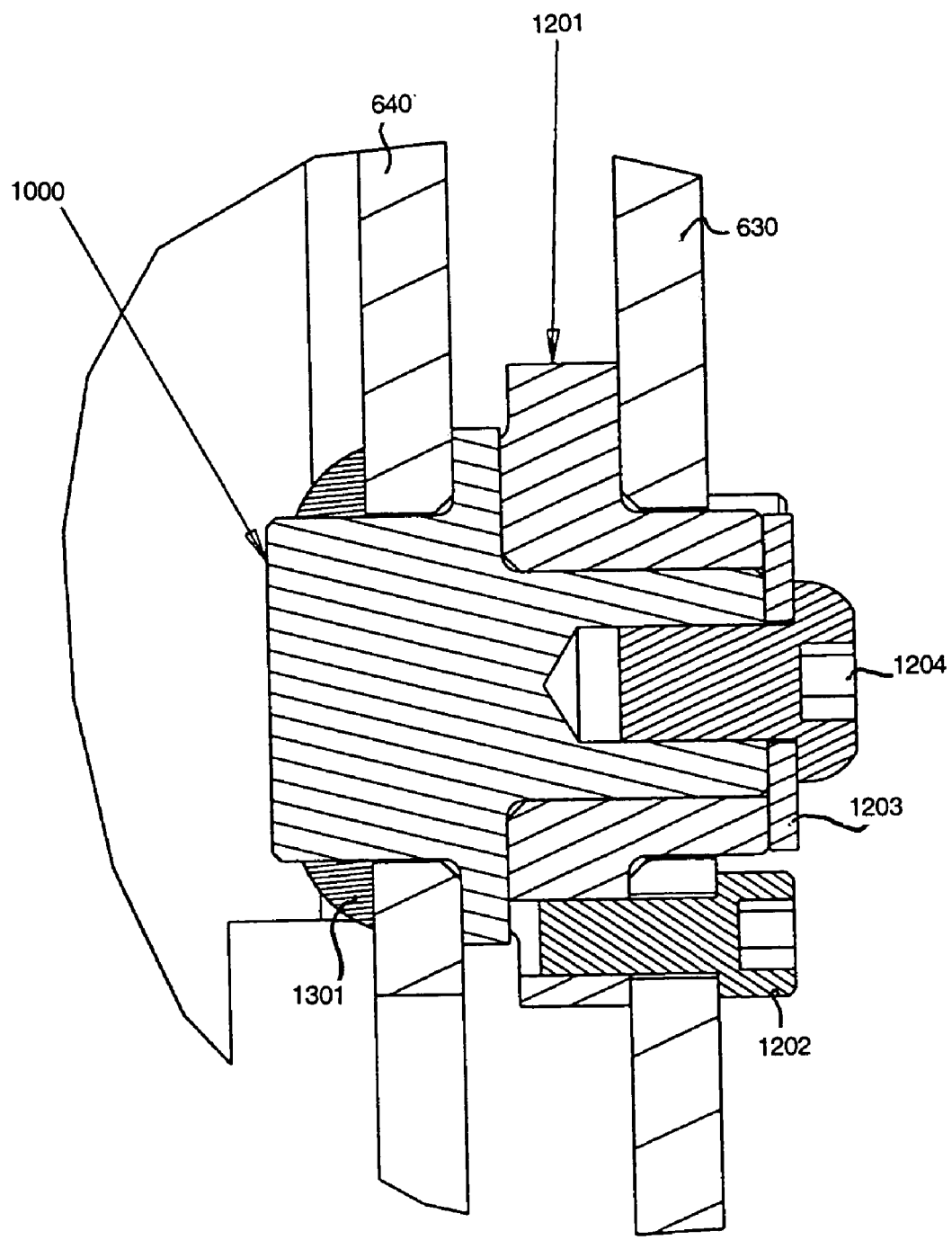
FIG. 13 is a section view of a pivot shaft and pivot bearing in accordance with embodiments of the present invention.

FIG. 13 is a section view of a pivot shaft 660 and pivot bearing 1201 in accordance with embodiments of the present invention. As shown in FIG. 13, pivot shaft 1000 and pivot bearing 1201 have been coupled as described above with reference to FIG. 12. Thus, cap screw 1204 passes through washer 1203 and is screwed into pivot shaft 1000. Also visible in FIG. 13 is the weld (e.g., 1301 which couples pivot shaft 1000 with lower motor mount 630. As shown in FIG. 13, upper motor mount 640 and lower motor mount 630 are not in direct contact.

In embodiments of the present invention, pivot shaft 1000 and pivot bearing 1201 are machined components. As described above, this facilitates controlling the fit tolerances between pivot shaft 1000 and pivot bearing 1201. For example, in one embodiment, the diametral tolerance for pivot shaft 1000 is within the diametral tolerance class RC4, shaft f7 as defined by the ANSI B4.1-1967, R1979 standard with a fit tolerance of H8. Thus, the diametral tolerances between pivot shaft 1000 and pivot bearing 1201 can be controlled so that out of plane movement of upper motor mount 640 with respect to lower motor mount 630 is kept within an acceptable limit. This also permits utilizing less precise tolerances in the fabrication of other components of motor mount assembly 600 because it will not diminish the precision of the fit between upper motor mount 640 and lower motor mount 630. For example, bearing hole 632 does not require a precise diametral tolerance because the diametral tolerance pivot shaft 1000 is more closely controlled. Similarly, the diametral tolerance of pivot shaft mounting hole 642 is not typically considered a critical tolerance because the diametral tolerance of pivot bearing 1201 is more closely controlled.

As discussed above with reference to FIG. 5, the nylon insert of the lock nut can, over time, become worn so that out of plane movement of the drive wheel occurs. In embodiments of the present invention, this can be minimized due to the materials selected for pivot shaft 1000 and pivot bearing 1201 and the tolerance between these components while still permitting rotation of upper motor mount 640 with respect to lower motor mount 630.

Figure 14B:
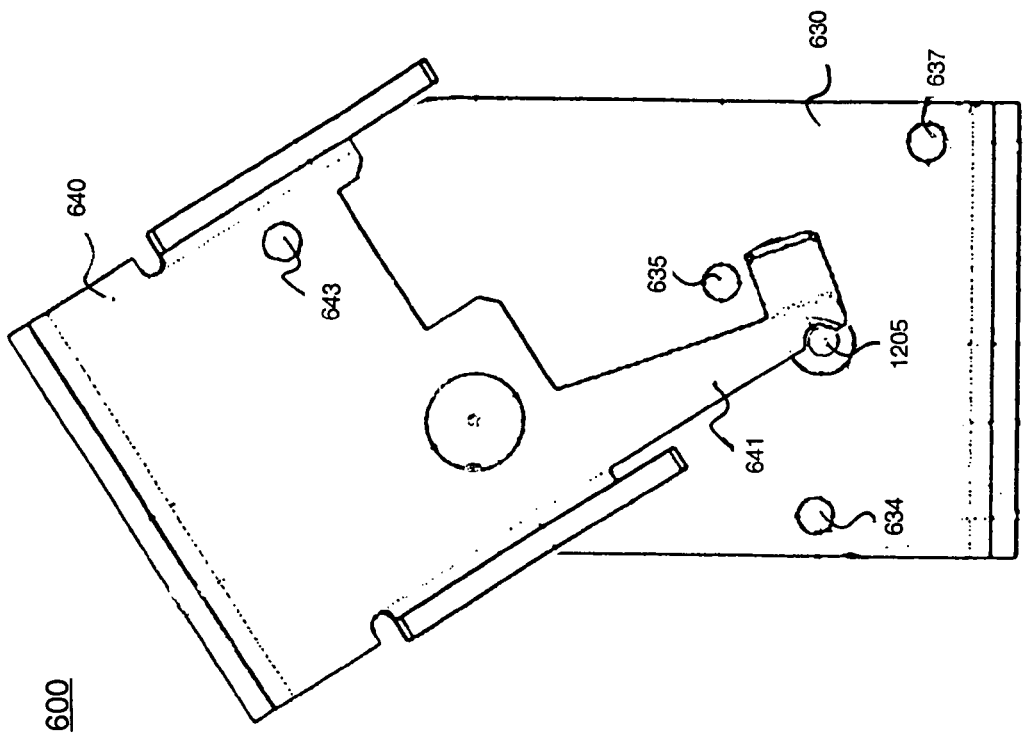
FIGS. 14A and 14B are front views of a motor mount assembly 600 used in accordance with embodiments of the present invention.
Figure 14A:
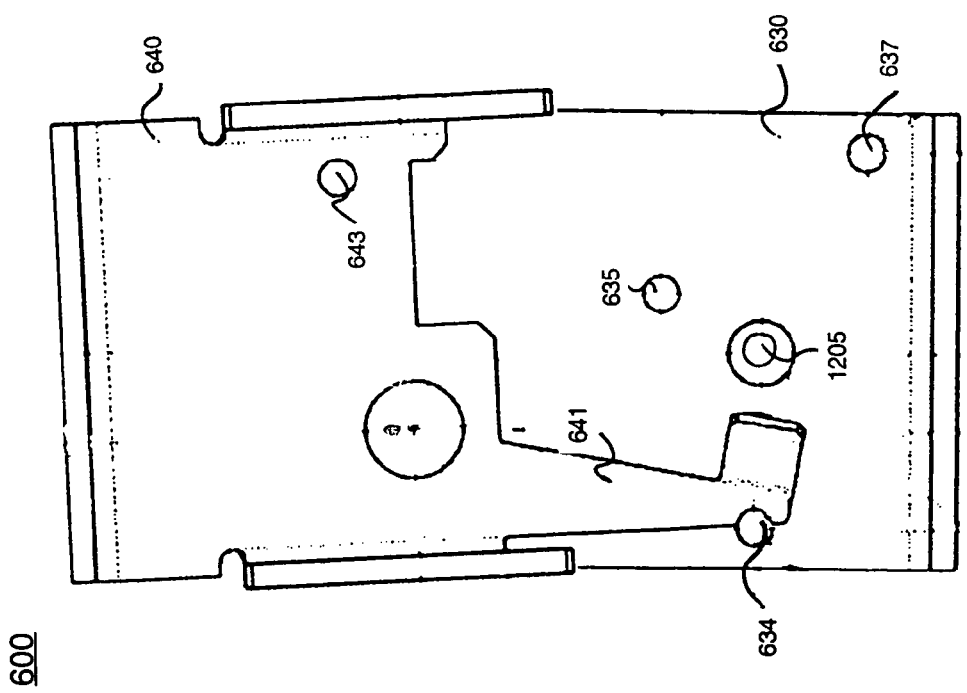

FIGS. 14A and 14B are front views of a motor mount assembly 600 used in accordance with embodiments of the present invention. It is noted that for clarity, some of the components of motor mount assembly 600 described above with reference to FIG. 12 have been omitted from FIGS. 14A and 14B. FIG. 14A shows upper motor mount 640 in a first position wherein a drive wheel (e.g., 620 of FIG. 6) is engaged with a steering wheel of a vehicle or other mobile machine. As shown in FIG. 14A, integrated latching lever 641 of upper motor mount 640 is engaged with first positive stop 634. This prevents over-rotation of upper motor mount 640 with respect to lower motor mount 630 due to the force exerted by spring 1209 (not shown). It is noted that there is a range of motion for upper motor mount 640 wherein integrated latching lever 641 can move between the engaged position shown in FIG. 14A and the disengaged position shown in FIG. 14B. This allows driving wheel 620 to be displaced by irregularities in the shape of the steering wheel or, for example, the user's fingers if they pass between the steering wheel and driving wheel 620. As a result, the user's fingers will not be pinched by driving wheel 620 if the user's fingers pass between the steering wheel and driving wheel 620.

In FIG. 14B, upper motor mount 640 has been moved to a second position in which the drive wheel (e.g., 620 of FIG. 6) is disengaged from the steering wheel of a vehicle or other mobile machine. In FIG. 14B, integrated latching lever 641 is engaged with latch pin 1205. This prevents upper motor mount 640 from disengaging from the second position unless a user releases upper motor mount 640 by, for example, pulling latch pin 1205. This is accomplished by moving upper motor mount 640 so that lead-in ramp 641*a* rides over the spring loaded latch pin 1205. When upper motor mount 640 has moved a sufficient distance, cutout 641*b* is disposed over spring loaded latch pin 1205, thus allowing the pin to extend again and upper motor mount 640 in the second position shown in FIG. 14B. Also shown in FIG. 14B is second positive stop 635 which prevents upper motor mount 640 from over-rotating in that direction because second positive stop 635 will contact integrated latching lever 641 and prevent further rotation.

The preferred embodiment of the present invention, a motor mount assembly for controlling a mobile machine, is thus described. While the present invention has been described in particular embodiments, it should be appreciated that the present invention should not be construed as limited by such embodiments, but rather construed according to the following claims.

What is claimed is:

1. A motor assembly comprising:
   a lower motor mount which is mechanically coupled with a steering column of a mobile machine;
   a drive motor coupled with a drive wheel;
   an upper motor mount comprising an integral latching lever and which is coupled with said lower motor mount and with said drive motor, said upper motor mount for maintaining pressure such that said drive wheel stays in contact with a steering wheel of said mobile machine when said upper motor mount is in a first position and for keeping said drive wheel away from said steering wheel when said upper motor mount is locked in a second position.

2. The motor assembly of claim 1 further comprising:
   a pivot shaft fixedly coupled with said upper motor mount; and
   a pivot bearing mechanically coupled with said lower motor mount, and wherein said pivot bearing rotates around said pivot shaft in a plane when said upper motor mount is coupled with said lower motor mount and prevents out of plane movement of said upper motor mount.

3. The motor assembly of claim 1 wherein said lower motor mount further comprises:
   a latching pin for positively locking said upper motor mount in said second position.

4. The motor assembly of claim 3 wherein said latching pin is a spring-loaded latching pin.

5. The motor assembly of claim 3 wherein said integral latching lever is for contacting said latching pin when said upper motor mount is in said second position.

6. The motor assembly of claim 1 further comprising:
   a spring coupled with said upper motor mount and with said lower motor mount, said spring for maintaining pressure upon said upper motor mount when in said first position.

7. The motor assembly of claim 1 wherein said lower motor mount further comprises:
   a first positive stop and a second positive stop to limit the range of movement of said upper motor mount.

8. The motor assembly of claim 1 wherein said motor mount assembly is operable for a user to move said upper motor mount between said first position and said second position using either hand.

9. The motor assembly of claim 1 further comprising:
   a cover assembly coupled with upper motor mount.

10. The motor assembly of claim 1 wherein said drive motor is selected from the group consisting of a permanent magnet brush direct current (DC) motor, a brushless DC motor, a stepper motor, and an alternating current (AC) servo motor.

11. The motor assembly of claim 10 wherein said motor generates approximately nineteen ounce/inches of torque per ampere of current.

12. The motor assembly of claim 1 wherein said drive motor is communicatively coupled with a control component, said control component for conveying a steering command to said drive motor in response to receiving position data describing the geographic position of said mobile machine.

13. A motor mount comprising:
- a lower motor mount which is mechanically coupled with a steering column of a mobile machine such that said lower motor mount remains fixed with respect to said steering column when coupled therewith;
- an upper motor mount comprising an integral latching lever and which is coupled with said lower motor mount via a pivot bearing, said upper motor mount for maintaining pressure upon a drive wheel in contact with a steering wheel of a mobile machine when said upper motor mount is in a first position and for keeping said drive wheel away from said steering wheel when said upper motor mount is locked in a second position; and
- a positive locking mechanism coupled with said lower motor mount and with said upper motor mount, said positive locking mechanism for locking said upper motor mount in a second position wherein drive wheel is disengaged from said steering wheel.

14. The motor mount of claim 13 wherein said pivot bearing defines a point of rotation for said upper motor mount.

15. The motor mount of claim 13 wherein said bearing limits out of plane movement of said upper motor mount with respect to said lower motor mount.

16. The motor mount of claim 13 wherein said positive locking mechanism comprises a spring loaded latching pin.

17. The motor mount of claim 16 wherein said integrated latching lever engages said spring loaded latching pin when said upper motor mount is in said second position.

18. The motor mount of claim 17 wherein said integrated latching lever further prevents moving said upper motor mount to said first position when engaged with said spring loaded latching pin.

19. The motor mount of claim 13 further comprising:
- a first positive stop and a second positive stop to limit the range of movement of said upper motor mount.

20. The motor mount of claim 13 further comprising:
- a spring coupled with said upper motor mount and with said lower motor mount, said spring for maintaining pressure upon said upper motor mount when in said first position.

21. The motor mount of claim 13 wherein said motor mount is operable for a user to move said upper motor mount between said first position and said second position using either hand.

22. A motor mount comprising:
- a lower motor mount which is mechanically coupled with a steering column of a mobile machine such that said lower motor mount remains fixed with respect to said steering column when coupled therewith;
- an upper motor mount comprising an integral latching lever and which is coupled with said lower motor mount via a pivot bearing and a spring, said upper motor mount for maintaining pressure upon a drive wheel in contact with a steering wheel of a mobile machine when said upper motor mount is operated in a first position and for keeping said drive wheel away from said steering wheel when said upper motor mount is operated in a second position; and
- a positive locking mechanism coupled with said lower motor mount and with said upper motor mount, said positive locking mechanism for locking said upper motor mount in a second position wherein drive wheel is disengaged from said steering wheel.

23. The motor mount of claim 22 wherein said pivot bearing defines a point of rotation for said upper motor mount.

24. The motor mount of claim 22 wherein said bearing limits out of plane movement of said upper motor mount with respect to said lower motor mount.

25. The motor mount of claim 22 wherein said positive locking mechanism comprises a spring loaded latching pin.

26. The motor mount of claim 25 wherein said integrated latching lever engages said spring loaded latching pin when said upper motor mount is in said second position.

27. The motor mount of claim 26 wherein said integrated latching lever further prevents moving said upper motor mount to said first position when engaged with said spring loaded latching pin.

28. The motor mount of claim 22 further comprising:
- a first positive stop and a second positive stop to limit the range of movement of said upper motor mount.

29. The motor mount of claim 22 wherein said motor mount is operable for a user to move said upper motor mount between said first position and said second position using either hand.

* * * * *